United States Patent [19]
Stone

[11] Patent Number: 4,600,834
[45] Date of Patent: Jul. 15, 1986

[54] PRECISION ZERO-HOME LOCATOR

[75] Inventor: William J. Stone, Kansas City, Mo.

[73] Assignee: The United States of America as represented by the United States Department of Energy, Washington, D.C.

[21] Appl. No.: 547,278

[22] Filed: Oct. 31, 1983

[51] Int. Cl.⁴ .............................................. G01D 5/34
[52] U.S. Cl. ......................... 250/231 SE; 250/237 R
[58] Field of Search ........ 250/231 SE, 237 R, 237 G; 340/347 P; 356/375; 200/DIG. 36

[56] References Cited

U.S. PATENT DOCUMENTS

| | | | |
|---|---|---|---|
| 3,159,750 | 12/1964 | Kazan | 250/231 |
| 3,193,686 | 7/1965 | Heinz | 250/211 |
| 3,399,347 | 8/1968 | Martens | 324/96 |
| 3,414,730 | 12/1968 | Nicolas | 250/217 |
| 3,544,801 | 12/1970 | Dyck | 250/237 |
| 3,689,163 | 9/1972 | Glorioso | 356/172 |
| 3,775,617 | 11/1973 | Dubauskas | 250/237 R |
| 3,885,877 | 5/1975 | Horwath | 356/172 |
| 4,103,155 | 7/1978 | Clark | 250/231 SE |
| 4,315,201 | 2/1982 | Suzuki et al. | 318/640 |
| 4,320,293 | 3/1982 | Guretzky | 250/231 SE |

Primary Examiner—David C. Nelms
Assistant Examiner—J. Gatto
Attorney, Agent, or Firm—George H. Libman; Albert Sopp; Judson R. Hightower

[57] ABSTRACT

A zero-home locator includes a fixed phototransistor switch and a moveable actuator including two symmetrical, opposed wedges, each wedge defining a point at which switching occurs. The zero-home location is the average of the positions of the points defined by the wedges.

7 Claims, 7 Drawing Figures

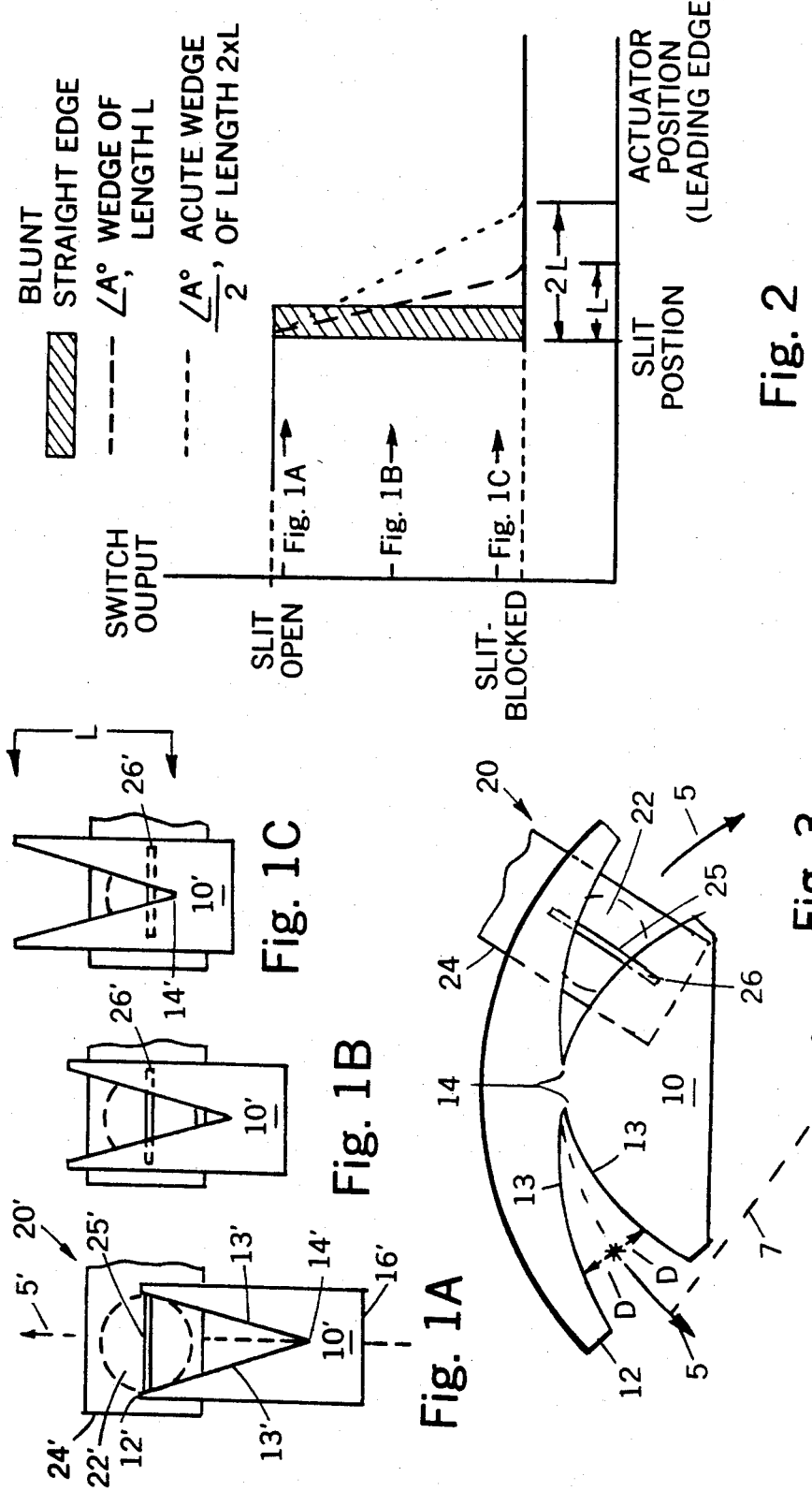

ZERO-HOME CIRCUIT

PRECISION ZERO-HOME LOCATOR

The U.S. Government has rights in this invention pursuant to Contract No. DE-AC04-76DP00613 between the Department of Energy and Bendix Corporation.

BACKGROUND OF THE INVENTION

The present invention relates generally to precision measurements and more particularly to a zero-home locator which enables repeated measurements over long time periods to be accurately taken by defining and periodically reconfirming an inexpensive primary fiducial that is easily discerned, readily repeated and usefully related to the necessary movements of the measuring instrument or its subject.

In any precision mapping, manufacturing or measuring system, one of the most rigorous requirements for accuracy and repeatability of operation is the establishment of the primary fiducial points from which all movements and dimensionings are referenced. Once established, these points, lines or planes should be easily sensed with the degree of resolution and repeatability required for the work at hand. For example, assume that a multi-point location system is required for the precision 3D mapping of arrays of miniature elements. In such a mapping instrument, several optical axes must be aligned with several mechanical axes which must be aligned with several electronic positional readout systems. Since each axis system must retain a known positional relationship relative to the others during the time-lengthy measurement and mapping process, all moving systems must be capable of returning to a precise starting position at the start of each mapping procedure and any relative shift of the axes during mapping must be readily discernible.

These functions are performed by a zero-home locator, a device which enables a moveable member's position to be repeatedly checked with respect to its register with a fixed member.

Prior to this invention, as a rule of thumb the hardware costs of implementing zero-home into automated systems was expensive and roughly proportional to the precision required. For instance, precision to ten mils could be obtained for a few tens of dollars while precision to 0.01 mil required a few ten thousands of dollars.

SUMMARY OF THE INVENTION

It is an object of this invention to provide a zero-home locator capable of high precision at low cost.

It is another object of this invention to provide a zero-home locator to convert a binary switch to a linear, analog sensing device of variable sensitivity.

It is still another object of this invention to provide zero-home precision to better than ±0.0002 inches for a few hundreds of dollars. It is a further object of this invention to provide a self-defining, readily reproducible, precise fiducial system.

Additional objects, advantages and novel features of the invention will become apparent to those skilled in the art upon examination of the following description or may be learned by practice of the invention. The objects and advantages of the invention may be realized and obtained by means of the instrumentalities and combinations particularly pointed out in the appended claims.

To achieve the foregoing and other objects and in accordance with the purpose of the present invention, as embodied and broadly described herein, the zero-home locator of this invention may comprise a switch for changing from a first state to a second state rigidly attached to a first member which is moveable with respect to a second member in only one degree-of-freedom along a fixed path of movement, two actuators for actuating the switch rigidly attached to the second member such that relative movement of the members causes each actuator to actuate the switch, a position indicator for providing an indication of the position of the first member with respect to the second member at the instant when the switch is actuated by either actuator, and means for averaging the indicated positions to define the zero-home location.

BRIEF DESCRIPTION OF THE DRAWINGS

The accompanying drawings, which are incorporated in the form of part of the specification, illustrate an embodiment of the present invention and, together with the description, served to explain the principals of the invention.

FIGS. 1A-1C show the operation of the position detector component of the invention.

FIG. 2 illustrates the output of the detector of the invention.

FIG. 3 shows a detector for a preferred embodiment of the invention.

DETAIL DESCRIPTION OF THE INVENTION

Figure 4:
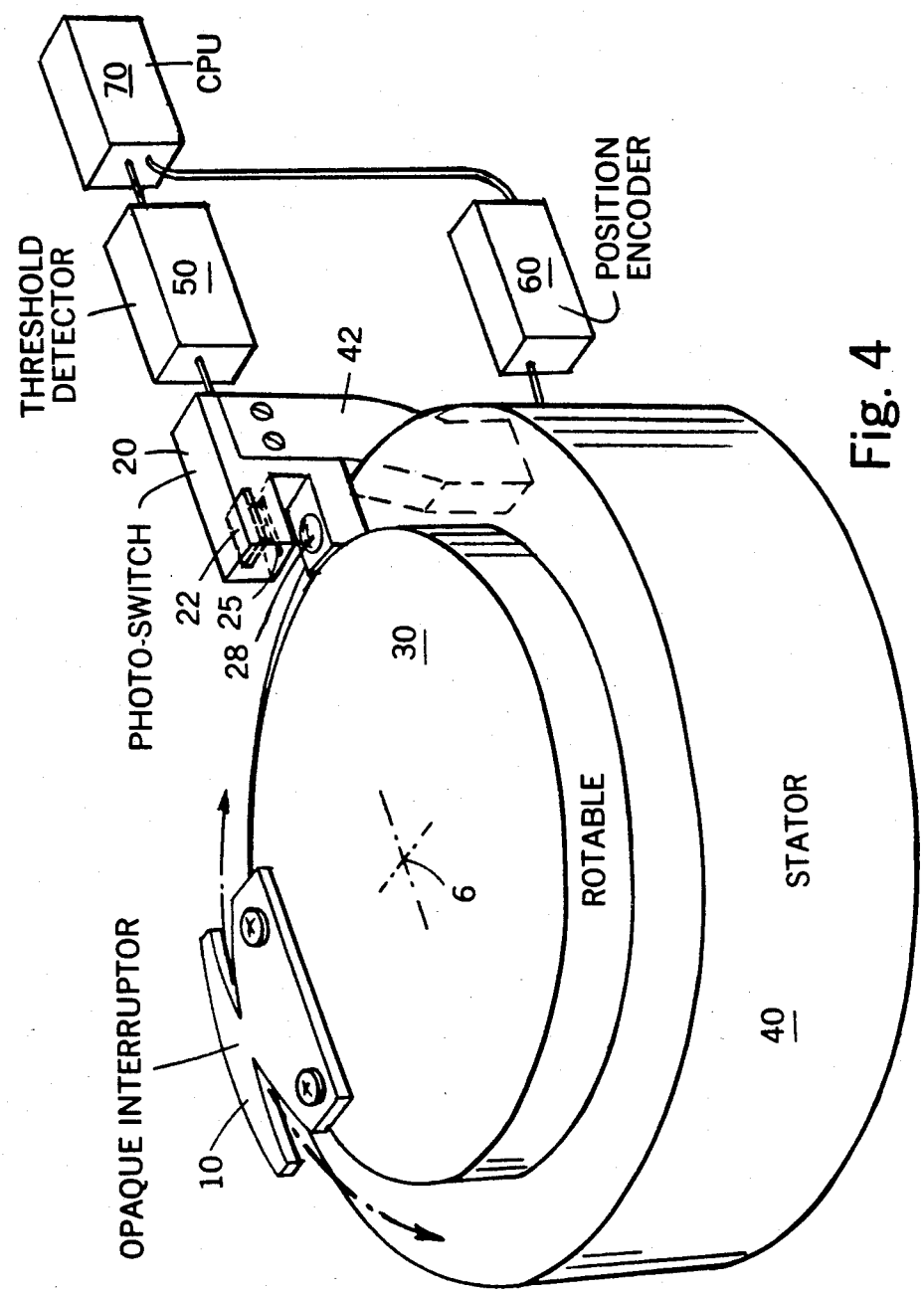
FIG. 4 is a perspective view of the system.

In applications such as the construction of semiconductor devices, layers of various semiconductor materials may be applied one-by-one to a substrate surface which must be moved during the manufacture of the subsequent layer. Before the next layer is applied, each successive mask must be positioned relative to this surface by motions relatives to an original starting location. A zero-home device is used on the positioning mechanisms to establish a fixed, repeatable prime fiducial and thus enables a proper positional register with respect to the surface by repeating the original starting position.

FIGS 1A-1C show a linear motion embodiment of the position detection system which may be used in the practice of this invention. As previously stated, the position of one member which moves relative to another member may be accurately located between two points along the path of movement of the members. Accordingly, in a linear movement embodiment of the invention, as shown in each of FIGS. 1A-1C, an opaque actuator 10' is movable in only one degree-of-freedom along a linear path of movement 5'. A stationary switch 20' is located in path of movement 5, Switch 20' includes a phototransistor 22' (shown in outline by a dotted circle), an opaque plate 24' covering phototransistor 22', and a light source (not shown) for shining light through slit 25' in plate 24' onto phototransistor 22'. Slit 25' is arranged transverse to and bisected by path of movement 5'.

Opaque actuator 10' comprises a moveable blade having a leading edge 12', two converging inside edges 13', and an apex 14'. This structure forms a wedge symmetrical around path of movement 5' which progressively blocks the light shining through slit 25' as actuator 10' moves across 20'.

As shown in FIG. 1A, actuator 10' has just reached switch 20' and is just beginning to block light shining through slit 25'. As shown in FIG. 1B, approximately ½ of sides 13' have passed slit 25', resulting in approximately ½ of slit 25' being blocked. The blocked portion of slit 25' is identified as 26'. In FIG. 1C, apex 14' has nearly reached slit 25', resulting in almost total blockage of the light passing the slit. It should be noted from FIG. 1C that equal lengths of blocked portion 26' are formed on each end of slit 25' by the symmetrical wedge formed by sides 13'.

Since slit 25' is uniformly covered from each end by the wedge, only a portion of the center of phototransistor 22' is exposed to light when switching occurs. Accordingly, variations in the sensitivity of other portions of the phototransistor will not effect repeatability of the measurements.

The operation of the apparatus of FIGS. 1A–1C is as follows. A conventional photoelectric switch such as the Clarex CLI-305˙ optical switch includes a light source and phototransistor 22' rigidly mounted in a compact, plastic package. The source is an LED that emits in the near-infrared spectrum. This Gaussian radiation forms a tight, single lobe pattern after passing through a glass-domed lens. The airgap between light source and phototransistor for the passage of actuator 10' is 0.25 inches. Phototransistor 22' has a 3/16 inch entrance aperture through a glass-domed lens. For increased resolution, the aperture is masked by five-mil wide light optical slit 25'. Phototransistor 22' drives an internal transistor to provide a Darlington configuration for an output. If this switch is used with a conventional blunt interrupter such as end 16' of actuator 10', the output of the optical switch is binary; i.e., the electrical signal switches rapidly from a first state to a second state as edge 16' covers slit 25'. In this conventional state-of-the-art mode, the device could provide homing repeatable to several ten-thousandths of an inch.

In the operation of this invention, the aforementioned optical switch is interrupted by actuator 10' as shown in FIGS. 1A–1C, effectively converting the binary switch to a linear, analog sensing device of variable sensitivity. FIG. 2 is a graphical representation of the output of switch 20' as a function of the position of three different actuators. The cross-hatched bar represents the step output of uncertainty of position (slit broadening) which occurs when a blunt edge 16' of actuator 10' passes slit 25'. The long dash line represents the variable (analog) output which results when a wedge of length of L passes slit 25'. As shown in FIG. 2, when the wedge is at the position of FIG. 1A, the switch output is substantially the same as when the slit is completely open. When approximately ½ of the slit is covered as shown in FIG. 1B, the output of switch 20' is approximately ½ of the difference between an open-switch voltage and a blocked-switch voltage. When the wedge is in the position of FIG. 1C, the fact that slit 25' is nearly completely blocked is represented by the much lower voltage at the output of switch 20'. Similarly, the short dash line shows the same curve for a longer wedge of length L×2.

Therefore, the wedges of the invention enable an electronic comparator circuit connected to the output of switch 20' to precisely locate a particular energy level represented by a point along the sloping curve caused by the passage of the wedge across the slit. The sensitivity of the system may be adjusted by changing the length and acuity of the wedges.

A particular embodiment of the invention required the determination of the zero-home location on a rotating member. Accordingly, actuator 10 of FIG. 3 was developed.

In the rotary embodiment shown in FIG. 3, actuator 10 includes the required plurality of wedges defined by inside edges 13 extending in either direction along a path of movement 5 having a radius of movement 7 from a center of movement 6. Although not shown in this figure, actuator 10 is rigidly attached to a body that rotates around center of movement 6. In order to provide the linear output from switch 20 shown in FIG. 2, edges 13 are arranged such that the perpendicular distance D between path of movement 5 and each edge 13 is equal at any given point along the wedge. As shown, the wedge at each leading edge 12 has a width twice D equal to the length of slot 25. The position of the right-hand wedge over phototransistor 22 is such that the covered portion 26 of slit 25 is approximately equal to the uncovered portion in view of the location of the slit approximately halfway along the wedge. Acutator 10 is shown with two symmetrically-opposed wedges in order that a shut off position may be determined on each wedge by rotating the actuator such that it approaches switch 20 from the open end of the wedge. The comparator circuit determines this position along each wedge. As discussed herein, the zero-home position is then obtained by averaging these two positions, resulting in an algorithm defined zero-home location somewhere between the apexes of the two wedges. This highly repeatable positional relationship between the rotating members is very forgiving of minor flaws in the symmetry of the wedges and the care with which they are mounted on the members.

FIG. 4 shows a specific embodiment of the invention wherein a stable base 40 has rigidly attached thereto a support arm 42 for support of switch 20 which is seen to comprise LED 28, slit 25 and phototransistor 22. Also, affixed to stablebase 40 is a moveable table 30 which rotates around center of movement 6. Rigidly attached to one edge of table 30 is actuator 10 of FIG. 3.

The electronic circuity for recording the zero-home position is connected to the output to switch 20. As broadly shown in FIG. 4, it includes threshold detector 50 having a preset voltage level representative of a point along the curve of FIG. 2 midway between the slit open and slit blocked positions for providing a pulse when the output voltage passes that position, a precision position encoder 60 which provides an indication of the position of table 30 relative to stable base 40 and a computer 70 for reading and recording the position when threshold detector 50 pulses. Computer 70 may then be used to compute the zero-home location from the position achieved by passing actuator 10 through switch 20 from each of the clockwise and counterclockwise directions.

In the case of modern computer-automated instruments and robotics where the computer control systems and the precision movement mechanisms are in existence; the addition of this invention to provide a zero-home capability to a few tens of micro-inch or tenths of arc-seconds is highly cost-effective, i.e., it can be done for about $200.00.

Figure 5:
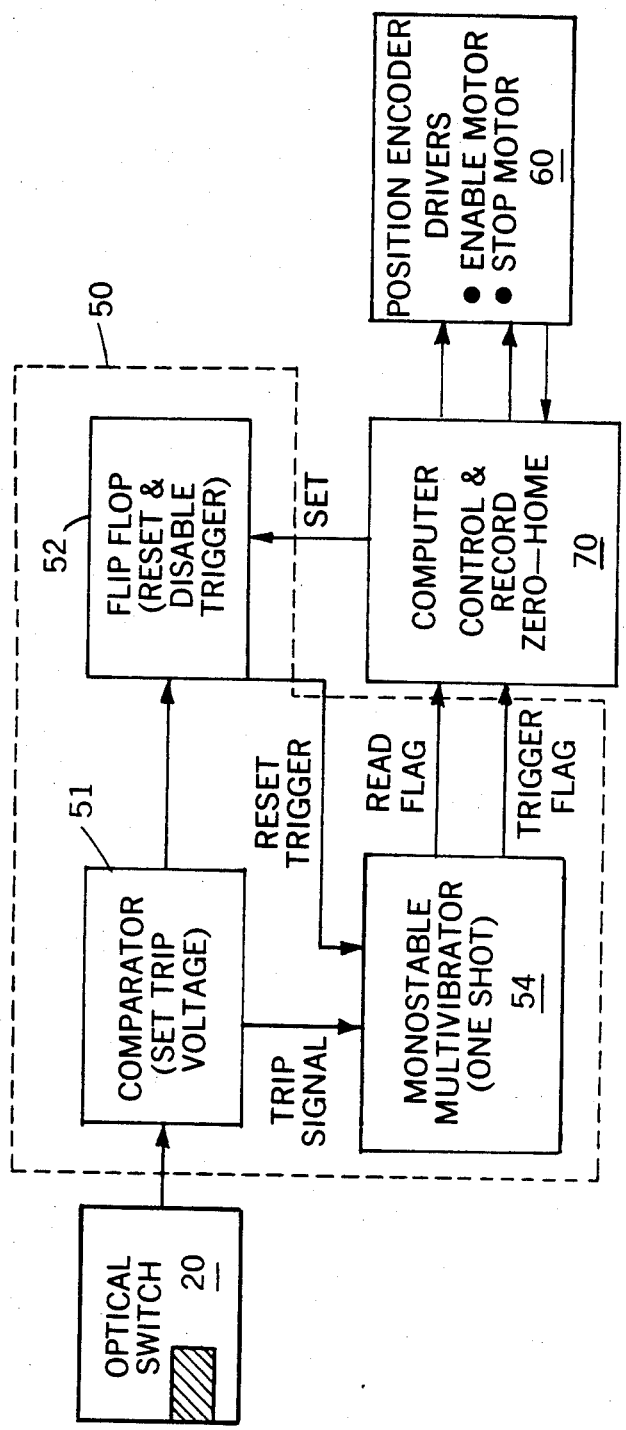
FIG. 5 is a block diagram of the control system of the invention.

FIG. 5 shows one specific embodiment of electronic circuitry which may be used in the practice of this invention. When a zero-home location is to be determined, optical switch 20 provides the voltage output shown in FIG. 2 to comparator 51 which is set at the trip voltage somewhere along the sloping portion of the curve. When actuator 10 blocks enough light from slit 25 to cause the voltage at comparator 51 to be less than the trip voltage, a trip signal is applied to a monostable multivibrator 54, resulting in one pulse from the multivibrator being applied to computer 70, causing the position of the moveable table as indicated by position encoder 60 to be read and stored. A flip-flop 52 is also provided to prevent multivibrator 54 from pulsing computer 70 unless a zero-home measurement has been ordered. A set line from computer 70 enables flip-flop 52 at the initiation of the measurement sequence, causing a reset pulse from flip-flop 52 to be applied to multivibrator 54, thereby enabling it to be pulsed upon the next application of a trip signal from comparator 50. At the same time the trip signal is applied to multivibrator 54, another pulse is sent to reset flip-flop 52 to prevent subsequent measurements until the set signal is subsequently provided by computer 70.

This invention provides a unique symmetrical linearity. The dual wedge faced interrupter produces a truncated sawtooth signal when rotated across the face of the detector. The leading and trailing edges of the signal being good approximations of straight lines. The flat response between these lines is the lack of signal due to the large opaque section between the two wedges' apexes. If during the short time period of the zero-home determination the lead and trailing edges remain linear mirror images; (their slopes and/or intercepts do not change significantly), a valid zero-home is located halfway between their two equal energy endpoint.

It has been found that variations in electrical power sources, temperature, humidity, etc., can cause existing phototransistor zero-home devices to yield inconsistent repeat readings. Therefore, one improvement principle of this invention is that symmetrical, equal energy positional readings are taken on each side of the home position and the values of these readings are averaged to define this fiducial position. The practical result is that many ambient condition inspired changes in one reading are cancelled out by an equal and opposite change in the other symmetrical reading.

The success of the dual wedge/symmetry was demonstrated by a series of measurements taken over a 24-hour period on a specific measuring system utilizing the invention. The measurements were made at random time intervals, each position measurement comprising an average of five position readings taken from each of 5 passes in clockwise (CW) and counterclockwise (CCW) directions. A typical range of the differences in averages between each set of five of the CW and CCW measurements over the measurement period was 0.0084 angular degrees, whereas the zero-home position calculated from the sum of each set of the two averages divided by two had a typical range of only 0.0001 angular degree (less than 50 times the variation in the difference in averages). This systematic increase in repeatability of a home position over single edge or single wedge devices derives from the strategy of balancing energy levels on both sides of the defined zero-home position. The prior single edge systems only attempt to reproduce the projected area of exposure in the sensor to determine the positional relationship.

The particular sizes, shapes and equipment discussed herein are cited merely to illustrate particular embodiments of the invention. It is contemplated that the use of this invention may involve different equipment as long as the claimed principles are followed. A zero-home location so constructed will provide an accurate and inexpensive reference for a moving member. It is intended that the scope of the invention be defined by the claims appended hereto.

We claim:

1. A zero-home locator for use with first and second members, said first member being movable with respect to said second member in only one degree-of-freedom along a path of movement, said locator comprising:
    switch means for changing from a first state to a second state when actuated, said switch being rigidly attached relative to said first member;
    two actuator means for actuating said switch, said actuators being rigidly attached relative to said second member such that movement of said members can cause each actuator to actuate said switch;
    position indicator means for providing an indication of the position of said first member with respect to said second member when said switch is actuated by each actuator; and
    means for averaging the indicated positions to provide the zero-home locator.

2. The zero-home locator of claim 1 wherein said switch means is a photoswitch comprising:
    a source of directed light; and
    light responsive means for providing a first electrical indication when receiving directed light from said source and for providing a second, different, electrical indication when not receiving light from said source; and wherein each of said actuator means comprises:
    blade means for obstructing the passage of light between said source and said light responsive means, both actuators forming a single piece of material.

3. The zero-home locator of claim 2 wherein said source further includes a narrow optical slit means for enhancing optical resolution of said switch, said slit having a narrow dimension arranged along the path of movement of said actuators.

4. The zero-home locator of claim 3 wherein said blade means are substantially identical, each comprising an opaque surface including a transparent wedge extending along the path of movement, said wedge having a wide portion at one end and a narrow portion at an opposing end, said wedge being symmetrically aligned along the path of movement such that the output of said light responsive means varies linearly from said first electrical indication when said one end is between said slit and said light responsive means to said second electrical indication when said other end is between said slit and said light responsive means.

5. The zero-home locator of claim 4 wherein said wedges are arranged with adjacent narrow portions, one wedge being a symmetrical mirror image of the other.

6. The zero-home locator of claim 5 wherein one of said members rotates around an axis, the other of said members is stationary, and the path of movement is circular.

7. The zero-home locator of claim 4 wherein said electrical indication is a voltage proportional to the energy level sensed by a fixed center of the light sensitive transducer and said locator further comprises a voltage comparator connected to the output of said light responsive means, said comparator providing a first voltage when the output is greater than a predetermined value and a second voltage when the output is less than the value, wherein the transition between first and second voltages marks the actuation of said switch.

* * * * *